United States Patent [19]

Gregg

[11] Patent Number: 4,615,753

[45] Date of Patent: Oct. 7, 1986

[54] PROCESS FOR MAKING A VIDEO RECORD DISC

[75] Inventor: David P. Gregg, Los Angeles, Calif.

[73] Assignee: Discovision Associates, Costa Mesa, Calif.

[21] Appl. No.: 672,659

[22] Filed: Nov. 19, 1984

Related U.S. Application Data

[60] Division of Ser. No. 399,075, Jul. 16, 1982, Pat. No. 4,500,484, which is a continuation of Ser. No. 936,982, Aug. 25, 1978, abandoned, which is a division of Ser. No. 812,157, Jul. 1, 1977, abandoned, which is a division of Ser. No. 571,259, Apr. 24, 1975, abandoned, which is a continuation-in-part of Ser. No. 735,007, Jun. 6, 1968, abandoned.

[51] Int. Cl.$^4$ .............. B31F 1/00; B29D 17/00; B29D 11/00; H04N 5/84
[52] U.S. Cl. .................. 156/219; 156/245; 264/107; 264/2.7; 358/347
[58] Field of Search .......... 264/107, 106, 322, 1.3, 264/2.7, 284, 314; 428/65; 156/308.4, 219, 182, 99, 245, 107, 249, 292; 358/345, 347, 342; 340/870.18, 870.25; 425/810

[56] References Cited

U.S. PATENT DOCUMENTS

| | | | |
|---|---|---|---|
| 1,877,447 | 9/1932 | Friebus | 358/342 |
| 2,547,009 | 4/1951 | Huston et al. | 340/870.18 |
| 2,776,452 | 1/1957 | Chavannes | 264/284 |
| 3,051,496 | 8/1962 | Borgia | 428/65 |
| 3,329,997 | 7/1967 | Rand et al. | 425/810 |
| 3,335,740 | 10/1970 | Frowde | 264/314 |
| 4,353,767 | 10/1982 | Wilkinson | 156/308.4 |

Primary Examiner—Edward Kimlin
Assistant Examiner—Lou Falasco
Attorney, Agent, or Firm—Ronald J. Clark

[57] ABSTRACT

A transparent record disc is provided which may appropriately have video signals optically recorded thereon, the record is composed of a lamination, for example, of pliant transparent plastic on a base of hard transparent plastic. The base provides strength for the record and the pliant plastic permits the video recording to be impressed into the record by simple embossing means, rather than by stamping or molding by which the surface of the record is actually raised above its melting point and caused to flow. An improved process for forming the video recordings on the disc record is also provided.

4 Claims, 6 Drawing Figures

U.S. Patent  Oct. 7, 1986  4,615,753
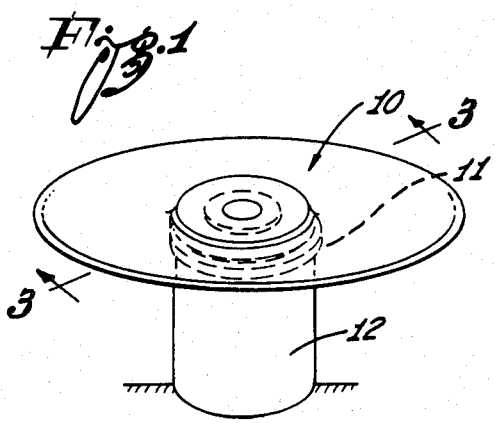
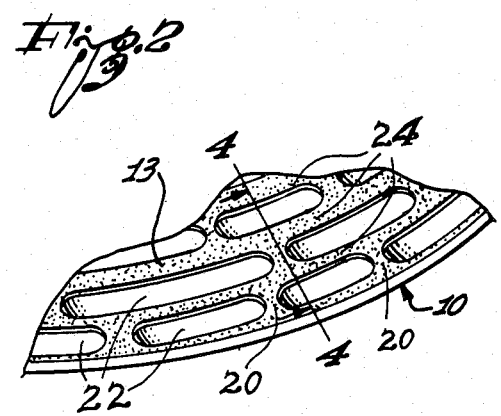
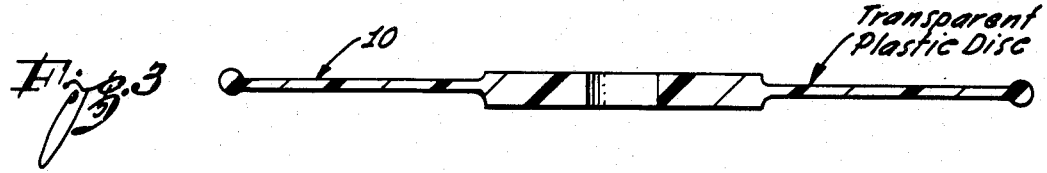
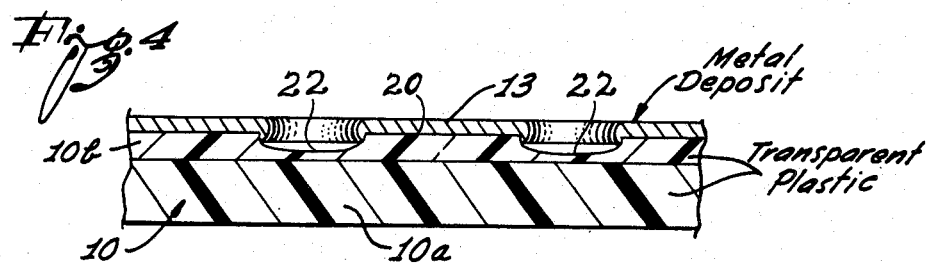
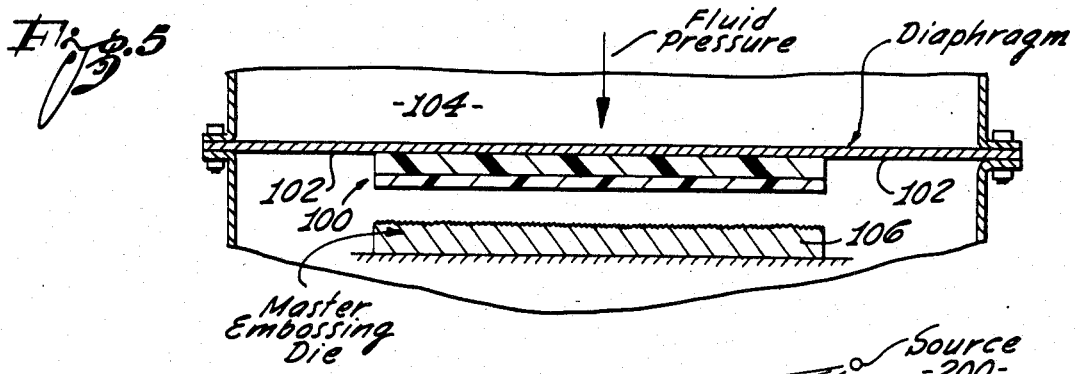
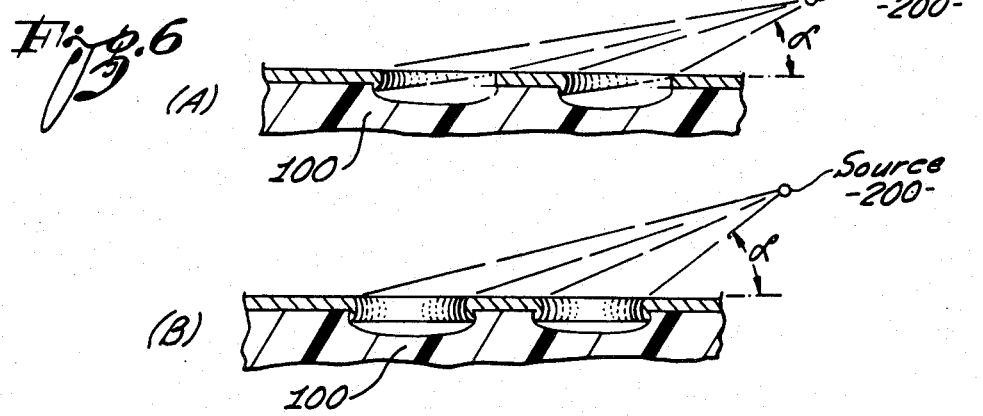

PROCESS FOR MAKING A VIDEO RECORD DISC

This is a division of application Ser. No. 399,075, filed July 16, 1982, now U.S. Pat. No. 4,500,484, which is a continuation of Ser. No. 936,982, filed Aug. 25, 1978, now abandoned, which is a division of Ser. No. 812,157, filed July 1, 1977, now abandoned, which is a division of Ser. No. 571,259, filed Apr. 24, 1975, now abandoned, which is a continuation-in-part of Ser. No. 735,007, filed June 6, 1968, now abandoned.

BACKGROUND OF THE INVENTION

A transparent plastic disc is described in the Copending Application Ser. No. 627,701, now U.S. Pat. No. 3,430,966, issued Mar. 4, 1969, in which picture information in the form of video signals is recorded on one or both sides of the disc. The recorded picture information on the disc is intended to be reproduced, for example, through a television receiver, by playing the disc on a turntable and by directing a light beam through the disc, as described in the Copending Application Ser. No. 507,474 now, abandoned, and its continuation-in-part application, now U.S. Pat. No. 3,530,258. The light beam is modulated by the video recordings on the disc, and a pick-up head is provided which responds to the resulting light signals to transform them into corresponding electrical video or picture signals for playback purposes.

The present invention is concerned with such a video disc record, and with a duplication process by which a multiplicity of such records may be mass-produced from a master record die. The material of the disc record surface is made such to be appropriate for embossing and to enable, under suitable temperature conditions, a slight force pressing the disc surface against a master die to cause the impressions on the surface of the die to be embossed into the surface of the disc. With such an embossing process, there is no transverse flow of the disc material, as occurs in the usual prior art stamping or molding processes, as are presently being used in the production of phonograph sound records, for example, and by which the actual surface of the record is raised above its melting point.

The stamping techniques presently being used in the manufacture of phonograph records are not suitable for the extraordinarily fine microgrooves and patterns required by video frequency recordings of picture information. Such stamping techniques as are presently being used in the production of phonograph sound records require that the master record die be heated to a temperature above the melting point of the vinyl or other plastic material used in the phonograph record.

In the prior art phonograph record duplicating process, a "biscuit" of the vinyl or other plastic material is placed in a "stamper", and the heated master record die is brought down onto one or both surfaces of the biscuit. The plastic of the biscuit surface is melted and caused to flow radially into the spaces defined by the impressions on the master die surface. As mentioned above, this stamping technique by present day standards appears to be unsuited for the extremely fine micro-spiral grooves required for video frequency recordings.

As an alternative to the present day practice, and as will be described, a video disc record blank of laminated transparent plastic construction may be provided, the laminated record having a surface layer of relatively soft transparent plastic of any suitable known type, and which can be readily embossed; and a supporting base of a rigid plastic, such as an acrylic resin or polyvinyl chloride. As a first step in the alternate approach, the laminated disc record blank is heated to a point at which the surface tension of the surface material causes the surface to be smooth and regular. This temperature is the critical temperature at which embossed impressions may be formed on the disc surface, and it is below the melting point of the surface material.

The embossing die(s) is(are) heated to a temperature slightly above the critical temperature, and it(they) and the record blank are brought together with a slight pressure. As the die(s) and the record blank are brought together, the die(s) is(are) cooled to the aforesaid critical temperature, and its (their) surface impressions are embossed into the surface(s) of the record. Obviously, if two "sides" are being embossed, two embossing dies are required. The supporting structure would require modification, but such modification is well within the skill of the art.

After the disc record has been embossed, as described above, an opaque mask is deposited into the portions of its surface around the resulting embossed microgrooves. This latter mask may be formed on the disc by using a vacuum deposition technique, as will be described.

The aforesaid disc record, when laminated in accordance with the aforesaid alternate approach, is used in order to present the desired surface characteristics for optimum embossing capabilities, and yet so that the record itself may be rugged and suitable for rough usage. The laminated structure of the record comprises reasonably tough and dimensionally stable clear plastic for the main body of the disc; and a plastic material on one or both surfaces of the disc which is most suited for embossing. The combination provides a video record disc which is useful, which can take on appropriate amount of handling, and which still can be embossed easily and effectively.

BRIEF DESCRIPTION OF THE DRAWINGS

FIG. 1 is a perspective representation of a disc which may be constructed in accordance with the concepts of the present invention, and by the process to be described, the disc being shown as mounted on an appropriate turntable;

FIG. 2 is a fragmentary representation of the disc shown in FIG. 1, on an enlarged scale;

FIG. 3 is a side section of the disc of FIG. 1, taken essentially along the line 3—3 of FIG. 1;

FIG. 4 is a section of the disc shown in FIG. 2, taken along the line 4—4 of FIG. 2;

FIG. 5 is a schematic representation showing the manner in which the impressions from a master die may be embossed into the surface of the disc record shown in FIGS. 1-4; and FIGS. 6A and 6B show various steps in which a surface opaque layer may be deposited over selected portions of the embossed disc record.

DETAILED DESCRIPTION OF THE ILLUSTRATED EMBODIMENT

The apparatus shown in FIG. 1 includes a video disc record 10 which may be constructed in accordance with the concepts of the present invention, and which has video signals optically recorded thereon. The video signals are recorded on the disc 10, as will be described, in a recording track which extends as a micro-spiral from the outer periphery of the disc towards its center. The recording track on the disc 10 may have a width, for example, of the order of 1 micron, and the spacing between adjacent convolutions of the disc may also be of the order of 1 micron.

As shown in FIGS. 2 and 4, the spiral recording track is formed in a planar surface of the disc 10 as a sequence of spaced, discontinuous micro-grooves 22. The successive micro-grooves have constant widths and constant depths and have continuously-variable lengths representative of the recorded video signals. High relief areas 20 of the disc surface are located circumferentially between the successive micro-grooves 22, and high relief intertrack portions 24 of the disc surface are located radially between adjacent convolutions of the spiral recording track. The successive high relief areas 20 are coplanar with the successive high relief intertrack portions 24. The successive micro-grooves 22 and high relief areas 20 are also referred to as first and second regions, respectively.

The video recording disc 10 is supported on a turntable 11 which, in turn, is rotatably driven by an electric motor 12. The motor 12 may rotate, the turntable at a relatively high speed, for example, in the range of 900–3600 rpm.

The disc 10 may have a cross sectional configuration as shown, for example, in FIG. 3. A metallic deposit is placed over portions of the upper surface of the disc 10, as designated 13 in FIGS. 2 and 4. As will be described, the disc 10 may have a laminated structure, shown in FIG. 4, to be composed of a first portion 10a of a relatively hard transparent plastic, such as polyvinyl chloride; whereas the upper portion 10b may be of a relatively soft transparent plastic which may be suitably embossed with the aforesaid micro-grooves when the aforesaid alternate procedure is followed. The disc 10 may include a portion similar to the portion 10b of its opposite side, and so as to constitute a two-sided record, as described in the Copending Application Ser. No. 741,020, filed June 28, 1968, and now U.S. Pat. No. 3,530,258.

The metallic deposit 13 is selectively placed on the high relief portions of the surface of the layer 10b after the surface has been embossed, so that the video recordings appear as discontinuous micro-grooves in which the transparency is retained, and which extend along a spiral recording track.

FIG. 2 shows the high relief regions at 20, the grooves at 22 and the spacing between adjacent convolutions at 24. A high relief region 20 is also referred to as a land or a first region. A groove 22 is also referred to as a discontinuity or a second region. A spacing 24 between adjacent convolutions is also referred to as an intertrack region. By inspection of FIG. 2, it can be seen that the grooves 22 or second regions are variable in length so as to modulate an impinging light beam with the information recorded on the videodisc 10.

FIG. 4 shows that a pair of intertrack regions, shown generally at 24, are coplanar with a first region, shown generally at 20.

As mentioned above, the duplication process contemplated, by which plastic record discs are formed on a mass production basis from a master die, is one in which embossing or stamping may be used. In carrying out the embossing process, for example, and as shown in FIG. 5, a plastic blank disc 100 may be attached to a diaphragm 102 in a suitable compartment 104.

The disc 100 may be constructed in the manner ʋ scribed above, so as to have a surface layer of relatively soft plastic material. The 100 in the chamber is then heated by any appropriate means to a critical temperature T1, which is such that the surface tension of the material forming the surface layer of the disc 100 causes the surface to be smooth and regular, also referred to as planar.

A master embossing die 106 is also provided, and it is mounted in a fixed position facing the plastic disc 100. The master die is then heated to a temperature which is slightly above the aforesaid critical temperature. The diaphragm 102 is then moved by fluid pressure, or by a ram, to bring the disc 100 against the embossing face of the master die 106. The temperature of the die is cooled back to the critical temperature. When the pressure is removed from the diaphragm 102, the attached disc is is moved back from the die 106, with the impressions of the die being embossed on the surface of the disc; but without causing either abrasion of the embossing die, or loss of information due to surface tension of the plastic material. The use of the diaphragm 102 prevents any minute side motion between the disc 100 and the die 106, as the disc is moved against the die, and vice versa.

If necessary, a slight vacuum pressure may be used at the end of the embossing operation to move the disc 100 back from the surface of the die 106. In addition, or as an alternative, electrostatic means may be used, the diaphragm 102 and master die 106 being metal, to cause these two members to move together and achieve the desired embossing action. For example, the master die 106 may be formed of tungsten steel, and the diaphragm 102 may be formed of nickel. Then, the two elements may be charged and discharged electrostatically, so as to bring the disc 100 against the face of the die 106, and subsequently to move the disc away from the die.

After the disc 100 has been embossed with the video information, for example, by the duplication process and apparatus of FIG. 5, a metal, or other opaque mask, is deposited onto the surfaces above the embossed micro-grooves which are formed in the surface of the disc. As mentioned above, a method of achieving this is to use vacuum deposition and a shadow mask technique, as shown schematically in FIGS. 6A and 6B.

As shown in the schematic sketches of FIGS. 6A and 6B, the disc 100 is considered to be mounted on a suitable turntable in a vacuum deposition chamber. The source(s) of the radiated meal 13', such as aluminum, designated 200, is(are) offset from the center of the disc 100 and raised slightly above its surface, as shown. The angle formed between the surface of the disc 100 and of the radiated metal is designated $\alpha$ in FIGS. 6A and 6B. If this angle is fairly small, then the radiated metal will be formed on the upper sides of the embossed grooves, first on one side as shown in FIG. 6A, and then continuously around to the other side, as the record rotates, as shown in FIG. 6B. Therefore, as the metal deposition process continues and as the record 100 rotates, a thin coating of metal will be formed over the top edges of the micro-grooves, and also on the upper lands and other high relief areas of the disc surface(s).

That is, if the disc 100 is held on a turntable, and if the turntable holding the disc is slowly turned, then on the first half revolution, and as shown in FIG. 6A, all the inside edges of the grooves will receive one coating of metal on the half furthest from the source. Then, when the record has gone through the next half revolution, both sides of the grooves will have received a continuous coating of metal around the edges of all the grooves, as shown in FIG. 6B. As the process continues through several revolutions, the corners of the metal deposit sharpen, and provide a uniform opaque metal layer over the high relief areas of the disc surface. The process has the feature of increasing the optical contrast ratio by the presence of the metal and by the fact that the grooves themselves are not coated on their bottoms.

The optical contrast ratios refer to the levels of light provided by the first and second regions 20 and 22, respectively. The metal covered region 20 reflects more light than the uncovered region 22. The uncovered region 22 transmits more light than the metal covered region 20.

In the finished disc, the surface has, arranged in a concentric spiral, deformities or discontinuities which are out of the plane of the surface and which deformities or discontinuities modulate impinging radiant energy to apply the information recorded on the disc to the radiant energy.

While a particular structure and process has been described, modifications may be made. The following claims define the invention.

What is claimed is:

1. A method for forming a plastic record disc having a spiral-shaped recording track that includes a succession of alternating regions of optical contrast having variable lengths, the method comprising the steps of:
   providing a die carrying a recording track complementary to that of a plastic record disc to be formed;
   attaching a heat softenable blank to a movable member, said member holding said blank in spaced relationship to the die;
   heating the blank to a temperature to render said blank embossable;
   moving the blank into compressive engagement with the die by moving said member to form a record disc having a planar recording surface with a spiral-shaped recording track that includes a succession of alternating regions of optical contrast having continuously-variable lengths;
   cooling the record disc such that the recording track is retained in the disc; and
   laminating the record disc, with the spiral-shaped recording track formed in the planar recording surface thereof, to a rigid, plastic supporting base.

2. A method for forming a plastic record disc having a spiral-shaped recording track that includes a succession of alternating regions of optical contrast having continuously-variable lengths, the method comprising the steps of:
   providing a die carrying a recording track complementary to that of a plastic record disc to be formed;
   positioning a plastic body in spaced relationship to the die;
   heating the plastic body to a first temperature;
   moving the plastic body into compressive engagement with the die, to form a record disc having a planar recording surface with a spiral-shaped recording track that includes a succession of alternating regions of optical contrast having continuously-variable lengths;
   cooling the record disc such that the recording track is retained in the disc; and
   laminating the record disc, with the spiral-shaped recording track formed in the planar recording surface thereof, to a rigid, plastic supporting base.

3. A method for embossing a spiral-shaped recording track in a plastic record disc, comprising steps of:
   providing a die carrying a spiral-shaped recording track having a shape complementary to that to be formed in the record blank;
   positioning a plastic, disc-shaped record blank in a spaced parallel relationship to the disc-shaped die;
   heating the record blank to a temperature below its melting temperature;
   moving the heated record blank into compressive engagement with the die, to form a spiral-shaped recording track in the blank and thereby form a record disc having a recording track that includes a succession of spaced micro-grooves having continuously-variable lengths;
   cooling the record disc, whereby the recording track is retained therein;
   returning the cooled record disc to a position spaced from the die; and
   laminating the record blank, with the spiral-shaped recording track formed therein, to a rigid, plastic supporting base.

4. A method for forming a plastic record disc having a spiral-shaped recording track that includes a succession of alternating regions of optical contrast having variable lengths, the method comprising the steps of:
   providing a disc-shaped unitary structural die member having a first planar surface for carrying an information signal in an information track including a plurality of circumferentially spaced, raised, second members extending away from the plane of the first surface and terminating in a second common plane, and wherein said information track is in the form of a spiral having a plurality of individual turns, each of said turns being separated from an adjacent one of said turns by an intertrack portion of said planar first surface, and the information track includes a plurality of alternately positioned first and second regions arranged in sequential order, and each of said first regions is formed from a portion of said first surface such that each of said first regions is coplanar with said intertrack portions of said first surface, and each of said first regions being located intermediate two of said second regions, and each of said second regions is formed with a constant dimension in the radial direction of the disc-shaped member and a constant maximum dimension in the direction perpendicular to said first surface, and each of said second regions is formed with a variable length representative of the information signal;
   heating said die member;
   moving a body of heated plastic into compressive engagement against said die to form a record disc having a planar recording surface with a spiral-shaped recording track that includes a succession of alternating regions of optical contrast having variable lengths;
   cooling the die during said period of compressive engagement such that the record disc retains the recording track in the disc when removed from said die; and
   laminating the disc-shaped member, with the spiral-shaped recording track formed in the planar recording surface thereof, to a rigid, plastic supporting base.

* * * * *